Nov. 1, 1949.     J. B. CLARK     2,486,389
FILTER ELEMENT

Filed June 1, 1945     2 Sheets-Sheet 1

INVENTOR.
Joel B. Clark
BY Parker, Prochnow & Farmer
Attorneys

Nov. 1, 1949.  J. B. CLARK  2,486,389
FILTER ELEMENT

Filed June 1, 1945  2 Sheets-Sheet 2

INVENTOR.
Joel B. Clark
BY Parker, Crochrow & Farmer
Attorneys

Patented Nov. 1, 1949

2,486,389

UNITED STATES PATENT OFFICE 2,486,389

FILTER ELEMENT

Joel B. Clark, Canfield, Ohio, assignor to The Auto Appliance Patents Co., Youngstown, Ohio, a corporation of Ohio Application June 1, 1945, Serial No. 597,004

1 Claim. (Cl. 210—140)

This invention relates to filter elements of the kind which may be removably inserted into a shell or housing of a filter and removed therefrom and discarded when they become plugged or filled with material removed from the fluid which is being filtered.

One of the objects of this invention is to provide a filter element of improved construction, increased efficiency and longer life. Another object is to provide a filter element which can be more readily removed from a filter housing after it has become filled with material removed from the fluid being filtered. A further object is to provide a filter element having a portion thereof enclosed in a perforate restricting band or cylinder which forms with the wall of the filter housing a passage for the filtered fluid. Another object is to provide a filter element for use in a filter housing and having a portion of the length thereof restricted to form a passage for filtered fluid between said restricted part and said housing, and another part which is unrestricted and engages the housing to form a seal between the inlet and discharge parts of the housing.

Other objects and advantages of this invention will appear from the following description and claim.

My improved filter element is shown as applied to oil filters of the type commonly employed in connection with internal combustion engines for filtering the crank case oil, but it will be understood that it is not intended to limit this invention to such use.

Figure 1:
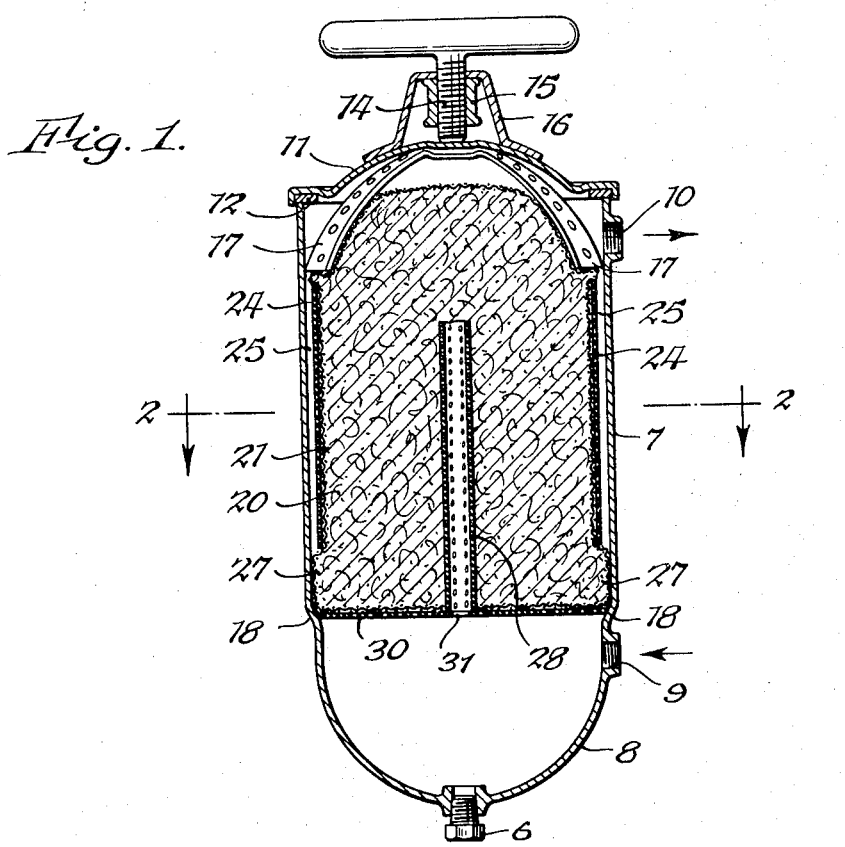
Fig. 1 is a central sectional elevation of a filter containing a filter element embodying this invention.
Figure 2:
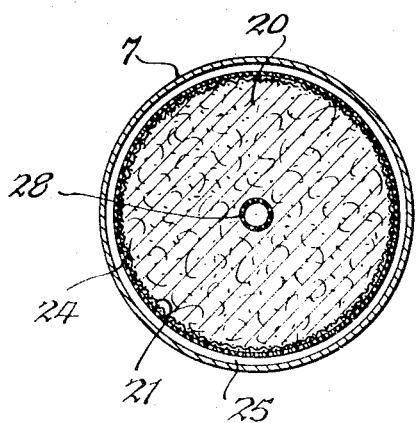
Fig. 2 is a transverse section thereof, on line 2—2, Fig. 1.

In the particular embodiment of this invention illustrated by way of example in Figs. 1 and 2, the filter element shown is intended for use in connection with a filter housing including a substantially cylindrical body portion 7, the lower portion of which terminates in a substantially hemispherical inlet portion 8 into which the fluid to be filtered is admitted, for example, through a pipe (not shown) leading into an inlet opening 9. Sediment collected in the inlet chamber may be removed through a drain opening closed by a removable plug 6. The upper part of the housing is provided with a discharge opening 10 for the filtrate. The upper end of the housing is closed by means of a cover or lid 11 which forms a tight seal with the upper end of the filter housing by means of a gasket 12. The lid may be pressed against the upper end of the housing by means of a screw 14 having a threaded engagement in a bracket 15 which may be mounted in any suitable manner so that the bracket and lid may be swung out of its operative position shown in Fig. 1, to permit access to the interior of the housing for removal and replacement of a filter element. A strap 16 may extend over the bracket 15 and have its lower ends secured to the lid 11 to hold the lid and bracket together. A spring member having a number of arms 17 is preferably arranged in the housing and bears against the lid 11 and the filtermass for pressing the latter downwardly against an internally extending annular shoulder 18 in the lower part of the housing. Housings of this type have heretofore been used in connection with filters and of themselves do not constitute a part of this invention.

In such prior housings, the filter element comprised a filtermass contained in a bag of fabric or the like and formed to fit snugly throughout its height against the cylindrical body portion 7 of the housing so that the fluid to be filtered entered the lower portion of the bag from the inlet end of the filter housing and passed upwardly throughout the length of the bag to the top thereof where it was discharged into the outlet or discharge portion of the housing.

In accordance with my invention, I provide a filtermass 20 contained in a bag 21 of suitable fabric or other porous material, but instead of forming the filter element so as to have all of its side portion pressed against the cylindrical body portion 7 of the housing by means of the spring arms 17 and the pressure of the fluid to be filtered, I provide means for confining or restricting a portion of the filter element in such a manner that this confined or restricted portion is in spaced relation to the cylindrical wall 7. This restricted portion extends from one end of the filter element to adjacent the other end thereof, thus forming a flow passage between the restricted part of the element and the housing, the passage thus formed communicating with one of the end spaces of the filter housing. The unrestricted zone of the filter element is free to contact with the inner surface of the wall of the housing, thus forming a seal between the inlet and discharge spaces in the filter housing.

The confining of a portion of the filter element against contact with the wall of the housing may be effected in any suitable or desired manner, and in the construction illustrated by way of example, I have provided a substantially rigid perforate cylinder 24, which may, for example, be made of perforated metal. The outside diameter of this cylinder is smaller than the inside diameter of the cylindrical housing part 7 so as to leave a space or flow passage 25 between the perforate restricting cylinder 24 and the body portion 7 of the housing through which the fluid may flow.

The perforate cylinder 24 terminates at its lower end at a distance from the lower end of the filter element, as clearly shown in Fig. 1, thus leaving an annular portion 27 of the filter element free to expand into engagement with the cylindrical body portion 7, and thus forming a seal to prevent fluid from the inlet portion 8 from passing into the annular discharge passage 25 without passing through a part of the filtermass. The sealing zone 27 should be arranged adjacent to the inlet end of the filter housing. Consequently, filtrate passing out of the filtermass through the perforations in the restricting band 24 flows upwardly to the discharge portion of the housing. This permits the filtered fluid to pass from the filtermass either upwardly to the top of the mass or laterally to the passage 25 between the perforate cylinder 24 and the cylindrical housing part 7. This arrangement of the sealing zone adjacent to the inlet to the housing has the advantage that it greatly facilitates the removal of the filter element, after it has been in use for a considerable period of time, since foreign matter and gummy material is removed from the oil by the filter element and will not be deposited in the flow passage 25 and will not interfere with the removal of the filtermass from the housing.

The upper end of the perforate cylinder 24 extends upwardly to a sufficient extent to prevent the forming of a similar seal at the upper portion of the filter element, thus assuring a clear passage for the filtrate from the annular passage 25 into the discharge portion of the housing.

The operation of the filter element may be further improved by providing some means for freely admitting fluid to be filtered into the interior of the filtermass, such for example as a perforate tubular member or passage arranged in approximately the middle portion of the filter element and communicating at its lower end with the inlet end of the filter housing, and terminating at its upper end at a distance from the upper end of the filtermass. For example, I have shown a perforate tube 28 for this purpose, which is open at its lower end to receive fluid to be filtered and some of this fluid may pass through the various perforations of the tube 28, and thus pass laterally through the filtermass to the annular discharge passage 25, and some of the fluid may pass out through the open upper end of the tube 28 and through the filtermass to the discharge portion in the upper end of the housing. It will be obvious that by means of the perforate tube 28 and the perforate cylinder 24 which confines the filter element to leave a clear discharge passage 25, the capacity of the filter element is greatly increased. Furthermore, the area through which fluid to be filtered passes into the filtermass is increased so that the filter element will function for a longer period of time before it becomes filled or plugged and must be replaced.

In order to assume a good seal between the annular portion 27 of the filter element and the lower portion of the cylindrical body 7 of the housing, a perforate retaining plate 30 may be provided at the lower end of the element, which may rest against the annular shouldered portion 18 of the housing, and thus prevent downward sagging of the middle portion of the filter element, which might result in breaking the seal with the cylindrical body 7. This perforate plate, however, may be omitted, if desired, for the reason that the pressure of the fluid to be filtered, against the lower end of the filter element, will ordinarily prevent the sagging of the lower end of the filter element and will also tend to force the lower part of the filter element into sealing engagement with the body portion 7. If a perforate plate 30 is employed, this plate preferably has a central hole 31 communicating with the perforate tube 28 to permit fluid to be filtered to freely enter into this tube.

Figure 3:
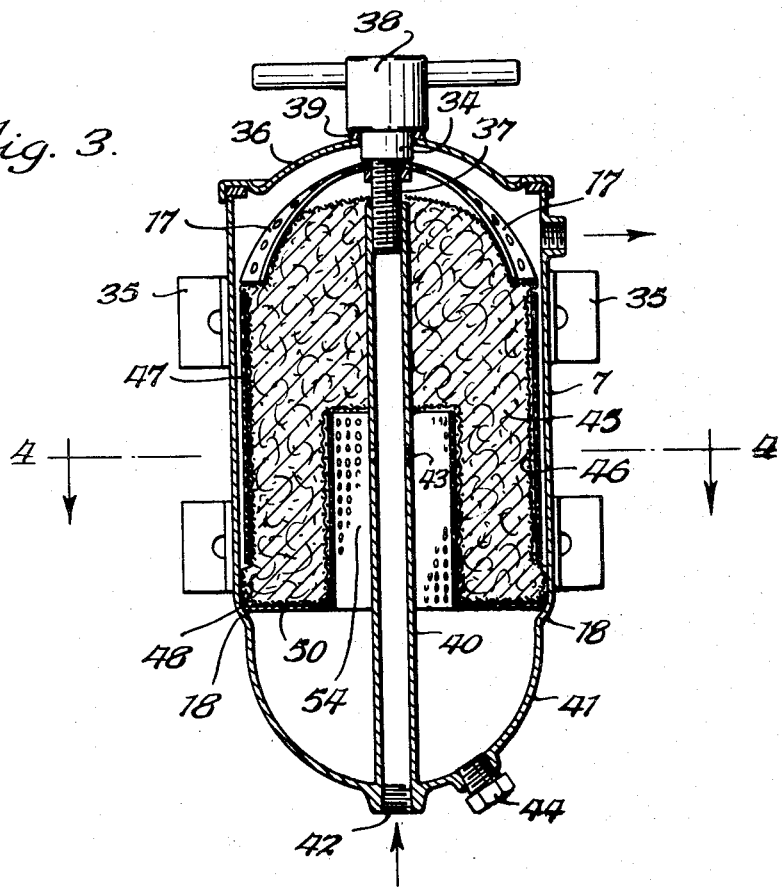
Fig. 3 is a central sectional elevation of a filter housing of different construction containing a filter element of modified construction.
Figure 4:
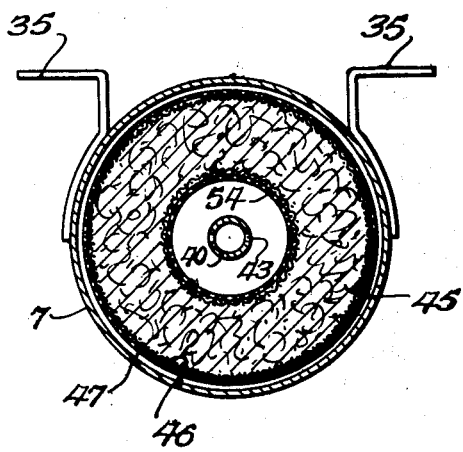
Fig. 4 is a transverse section thereof, on line 4—4, Fig. 3.

In Figs. 3 and 4, I have shown a filter element embodying my invention applied to a different type of filter housing. This housing is quite similar to the one shown in Figs. 1 and 2, except that the body portion 7 is provided with suitable brackets 35 by means of which the filter may be secured to a suitable support, and the lid 36 of the housing is pressed into tightly closing position by means of a clamping screw 37 having a head 38 which bears against the middle portion of the cover 36. The screw passes through a hole in the lid and a gasket 39 is interposed between the lid and the head 38 of the screw. The screw engages a correspondingly threaded part of a central tube 40 which is secured to the lower central part of the inlet portion 41 of the housing and communicates with an inlet opening 42 through which the fluid to be filtered is admitted to the inlet portion of the filter housing through one or more openings 43 in this tube. 44 represents a drain plug which may be removed for draining material collected in the lower part of the filter housing. The screw 37 has a shouldered part 34 in the interior of the housing which engages a spring member or spider having spring arms 17 which press the filtermass downwardly, as described in connection with Figs. 1 and 2.

For filter housings of this type, my improved filter element includes a filtermass 45 which, in the construction shown, is also contained within a bag 46 of textile or other material through which the filtrate may readily flow, and the filter element is also provided with a restricting band to form a flow passage for the filtrate between the element and the body portion 7 of the filter housing, and a perforate metal cylinder 47 is shown for this purpose. This cylinder also terminates at its lower end at a distance above the lower end of the filter element to form a sealing portion 48 which may be pressed against the lower portion of the cylindrical portion 7 of the housing by means of the spring arms 17 and by the upward pressure of the fluid to be filtered. The filter element in this case is provided with a central aperture through which the inlet tube 40 may pass.

In this construction, I have shown an imperforate annular disk or plate 50 which supports the lower end of the filter element and the peripheral part of which rests against the shoulder 18 of the housing. I have also provided a perforated tube or cylinder 54 in the lower middle portion of the filter element which extends upwardly from the lower edge thereof, and the lower edge of which may rest on the annular disk 50.

The operation of this filter element is similar to that described in connection with the construction shown in Figs. 1 and 2. The oil from the lower or inlet portion of the filter housing passes upwardly into the perforated tube 54 and then passes through the filter element, either more or less radially from the perforations in the tube 54 toward the discharge passage formed between the perforate restricting cylinder 47 and the body portion 7 of the filter housing and some of the fluid may pass upwardly through the open end of the tube 54 into the filtermass and flow upwardly to the discharge end of the housing.

In addition to the advantages of my improved filter element which have already been stated, my improved element has the further advantage that the restricting bands or perforate cylinders 24 and 47, by confining the greater portion of the filtermass against contact with the inner surface of the cylindrical body portion 7, greatly facilitates the removal of the filter elements when the passages in the same have been plugged up by material removed from the fluid. In prior constructions, it was sometimes very difficult to remove the filtermass from the filter housing because of the fact that the filtermass was packed tightly against the inner surface of the housing, due to pressure of the fluid to be filtered and due to the fi'ling up of the filtermass with material filtered from the fluid. With my improved construction, the filter element bears against the filter housing only along a relatively small area at the bottom of the filter element, thus greatly facilitating the removal of the filter element from the housing.

While I have shown the bags 21 and 46 of the filter unit within the restricting cylinder 24, it will be obvious that if the filtermass is made of cotton waste or other fibrous material, the perforate restricting cylinder 24 may be arranged in direct contact with the filtermass and with the bag outside of the restricting cylinder. The bag would, consequently, be in the flow passage 25, but since these bags are made of relatively thin material, this would in no way interfere with the free flow of the filtrate in this passage. If the filtermass is of granular or powdered material, the bag is preferably confined within the restricting perforate cylinder as shown in the drawings. It will also be obvious that with certain types of filtermasses, the bag may be omitted.

I claim as my invention:

An oil filter element for use in a cylindrical filter housing having inlet for oil to be filtered in the lower part thereof and a discharge for filtered oil in the upper portion thereof, said filter element comprising a substantially cylindrical filtermass confined in a bag of material pervious to the oil to be filtered, a perforate restricting band extending about the greater portion of the sides of said filtermass and extending from the upper end thereof into proximity to the lower end, the portion of said filter element from said lower end thereof to the adjacent end of said restricting band being free to engage the inner surface of the filter housing to form a seal at the lower end of said band between the inlet and the discharge thereof and said restricted portion forming a passage for filtered oil between said restricted part of said element and said housing and communicating with said discharge of said housing, a perforate plate at said lower end of said element, a perforate tube extending from said plate into said filtermass, said perforate plate having an opening registering with said perforate tube to establish communication between said tube and said inlet of said filter housing.

JOEL B. CLARK.

REFERENCES CITED

The following references are of record in the file of this patent:

UNITED STATES PATENTS

| Number | Name | Date |
| --- | --- | --- |
| 2,130,287 | Nooney | Sept. 13, 1938 |
| 2,168,124 | Hurn | Aug. 1, 1939 |
| 2,284,447 | Redner | May 26, 1942 |
| 2,298,674 | Burhans | Oct. 13, 1942 |
| 2,348,651 | Schelly | May 9, 1944 |